United States Patent
Zhu et al.

(10) Patent No.: US 8,850,703 B2
(45) Date of Patent: Oct. 7, 2014

(54) METHOD FOR THE MANUFACTURE OF THE BLADE TIPS OF ROTOR WHEELS MADE IN BLISK DESIGN

(75) Inventors: Leping Zhu, Darmstadt (DE); Gregor Riedel, Budingen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 820 days.

(21) Appl. No.: 12/685,813

(22) Filed: Jan. 12, 2010

(65) Prior Publication Data
US 2010/0175256 A1  Jul. 15, 2010

(30) Foreign Application Priority Data
Jan. 13, 2009  (DE) .......................... 10 2009 004 791

(51) Int. Cl.
| | |
|---|---|
| B23P 15/02 | (2006.01) |
| F04D 29/32 | (2006.01) |
| F01D 5/34 | (2006.01) |
| B23C 3/18 | (2006.01) |
| F04D 29/64 | (2006.01) |
| B23P 15/00 | (2006.01) |
| B23P 13/02 | (2006.01) |

(52) U.S. Cl.
CPC ............. B23P 15/006 (2013.01); F04D 29/324 (2013.01); F01D 5/34 (2013.01); B23C 3/18 (2013.01); B23C 2215/44 (2013.01); F05D 2230/10 (2013.01); F04D 29/644 (2013.01); B23C 2265/08 (2013.01); B23P 13/02 (2013.01)
USPC ....................................... 29/889.7; 29/889.23

(58) Field of Classification Search
CPC ............ B23C 2215/44; B23C 2215/56; B23C 2265/08; B23P 6/002; B23P 15/02; B23P 15/04; B23P 15/006
USPC ............. 29/889.7, 889.6, 889.23, 419.1, 557, 29/558
See application file for complete search history.

(56) References Cited

U.S. PATENT DOCUMENTS 4,309,848 A * 1/1982 Arrigoni ........................ 451/296
5,125,775 A * 6/1992 Breuer et al. ................. 409/132
(Continued)

FOREIGN PATENT DOCUMENTS

DE  102006002617  7/2007
EP  1990131  11/2008
(Continued)

OTHER PUBLICATIONS

German Search Report dated Apr. 27, 2010 from corresponding German patent application.

*Primary Examiner* — Christopher Besler
(74) *Attorney, Agent, or Firm* — Timothy J. Klima; Shuttleworth & Ingersoll, PLC

(57) ABSTRACT

With a method for finish-machining the blade tips of rotor wheels made in BLISK design, the rotor wheel or multi-stage compressor rotor (1), is machined—blade by blade and stage by stage—at the blade tips (2) by a conical cutter (5) whose cutting edge (6) is oriented tangentially to the outside surface of the rotor wheel/compressor rotor and routed on the blade tip essentially along the centerline thereof, with the cutting force being introduced perpendicular to the tool axis and in the stiffest direction of the blade (3), i.e. the centerline (11) of the blade cross-section and the perpendicular axis extending from the centerline. The cutting action and the force introduction of the conical cutter at the blade tip allow production of blade tips with a geometrically precisely defined edge without setting the respective blades into vibration.

19 Claims, 1 Drawing Sheet

(56) References Cited

U.S. PATENT DOCUMENTS

Figure 1:
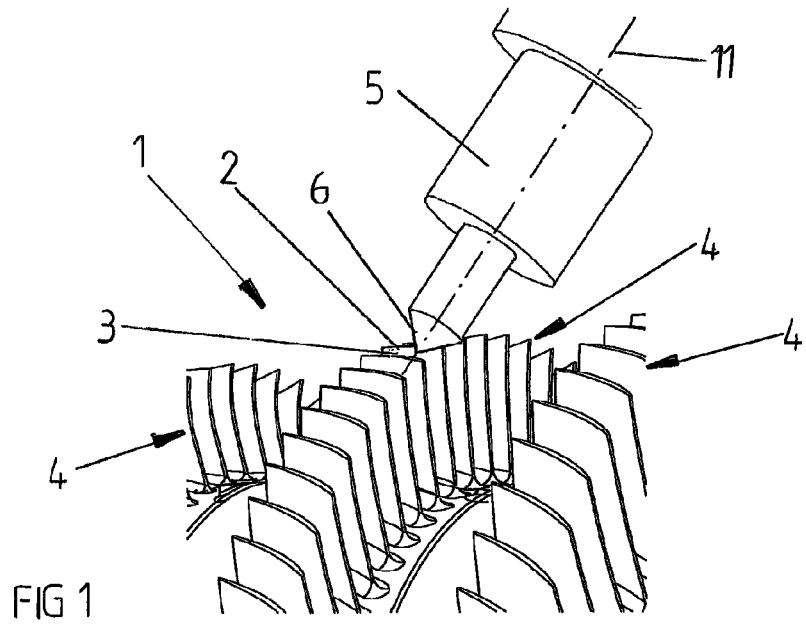

| | | | |
|---|---|---|---|
| 6,077,002 A | 6/2000 | Lowe | |
| 6,568,077 B1 * | 5/2003 | Hellemann et al. | 29/889.1 |
| 6,905,312 B2 * | 6/2005 | Bourgy et al. | 416/234 |
| 7,261,500 B2 * | 8/2007 | Killer et al. | 409/132 |
| 7,833,086 B2 | 11/2010 | Mielke | |
| 7,971,356 B2 | 7/2011 | Orobengoa | |
| 2008/0005904 A1 * | 1/2008 | Orobengoa Ortubay et al. | 29/889.23 |
| 2009/0113683 A1 | 5/2009 | Secherling | |

FOREIGN PATENT DOCUMENTS

| | | |
|---|---|---|
| EP | 2030719 | 3/2009 |
| GB | 2270485 | 3/1994 |
| JP | 2000135616 A | 5/2000 |
| JP | 2003120203 | 4/2003 |
| JP | 2003340629 | 12/2003 |
| JP | 2003340706 | 12/2003 |
| WO | 2005/065885 | 7/2005 |

* cited by examiner

METHOD FOR THE MANUFACTURE OF THE BLADE TIPS OF ROTOR WHEELS MADE IN BLISK DESIGN

This application claims priority to German Patent Application DE102009004791.3 filed Jan. 13, 2009, the entirety of which is incorporated by reference herein.

The present invention relates to a method for the manufacture of the blade tips of rotor wheels made in BLISK design, in particular of compressor rotors for aircraft gas turbines.

It is generally known that the blade tips of conventional rotor wheels, on which the blades are mounted to the rotor disks, are produced by grinding with the rotor being rotated at high speed, resulting in a centrifugal force moving the blades outwards and positioning them against the grinding wheel in a damped way.

Blade tip grinding is a difficult machining process with integrally designed rotors or rotor drums of compressors for aircraft gas turbines because the blades are highly loaded by the blade vibrations occurring, and, furthermore, they may unwind under the effect of the grinding wheel force. This affects service life and dimensional accuracy of the blades. In order to avoid the disadvantages caused by vibration of the BLISK blades, elastic damping elements are provided between the blades or the blades are enclosed by elastomer elements, or the space between the blades is cast out. Apart from the high work effort incurred by such vibration-damping measures, undesired form and dimensional deviations can occur when relieving the blades restrained during grinding.

It is therefore an object of the present invention to provide a method for machining the blade tips of rotors made in BLISK design for the compressors of gas-turbine engines which ensures high dimensional accuracy and a defined tip geometry of the blades while allowing expensive damping measures to be dispensed with.

The present invention, in essence, provides a method for finish-machining the blade tips of rotor wheels made in BLISK design, in particular of multi-stage compressor rotors (compressor drums) for aircraft gas turbines or also industrial gas turbines, in which the rotor wheel, or also a multi-stage compressor rotor, restrained in a clamping fixture is machined—blade by blade and stage by stage—at the blade tips by a conical cutter whose cutting edge is oriented tangentially to the outside surface of the rotor wheel or the compressor rotor and routed on the blade tip essentially along the centerline thereof, with the cutting force being introduced perpendicular to the tool axis and in the stiffest direction of the blade, i.e. the centerline of the blade cross-section and the perpendicular axis extending from the centerline. The cutting action and the force introduction of the conical cutter at the blade tip are such that blade tips with a geometrically precisely defined edge can be produced without setting the respective blade into vibration, thereby dispensing with time-consuming and cost-intensive assembly and disassembly of damping means likely leading to distortion and, consequently, dimensional deviations of the blades.

The blade geometry can, in dependence of the blade thickness and the course of the tool path in relation to the centerline, be linear, ramp-like or faceted.

In an embodiment of the present invention, the tip angle of the conical cutter is between 30° and 150° and any range therein and its helix angle between 0° and 60° and any range therein.

In a further development of the present invention, blade tip machining is performed using a coolant-lubricant.

In a further embodiment of the method according to the present invention, upon clamping the rotor wheel or the compressor rotor, the position and zero position of the workpiece are first determined using a measuring device, then all blade tips initially rough-milled one after the other and, upon subsequent dimensional re-inspection and determination of the correction values, finish-milled with a check measurement being taken thereafter.

In another embodiment of the present invention, upon clamping the rotor wheel or the compressor rotor, the position and zero position of the workpiece are first determined using a measuring device, then a blade tip is rough-milled and, upon dimensional inspection and determination of the correction values, the same blade tip is finish-milled and a further check measurement is taken. Thereafter, the remaining blades are processed in the same way.

If applicable, the process steps finish-milling and dimensional re-inspection can be repeated until the desired finish dimension is obtained.

The present invention is more fully described in light of the accompanying drawings showing a preferred embodiment. In the drawings, FIG. 1 is a partial view of a compressor rotor during machining of the blade tips using a conical cutter, FIG. 2 is an enlarged top view of individual blades of a stage, and FIG. 3 is a schematic sectional view of three different blade geometries.

FIG. 1 shows a portion of a BLISK design compressor rotor 1 of an aircraft gas turbine during machining of the blade tips 2 of the blades 3 of a stage 4 by five-axis milling using a conical cutter 5 with a coolant-lubricant. The conical cutter 5 has a tip angle between 30° and 150° (and any range therein) and a helix angle between 0° and 60° (and any range therein). Upon restraining the compressor drum in a clamping fixture, the position and zero position of the compressor drum are determined directly in the machine tool using an optical measuring system. Thereafter, the blade tips 2 are rough-milled and then dimensionally re-inspected and the correction values for the subsequent, successive finish-milling of the individual blade tips 2 determined. During machining, the conical cutter 5 is routed in such a manner that its cutting edge 6 is always tangential to the outside surface of the respective stage 4 of the compressor rotor 1. (The tool axis is oriented in normal direction—as viewed in the projection plane tangential to the outside surface of the compressor rotor). Upon finish-milling, the blade tip diameter is dimensionally re-inspected, with finish-milling and subsequent dimensional inspection being repeated, if applicable.

Figure 2:
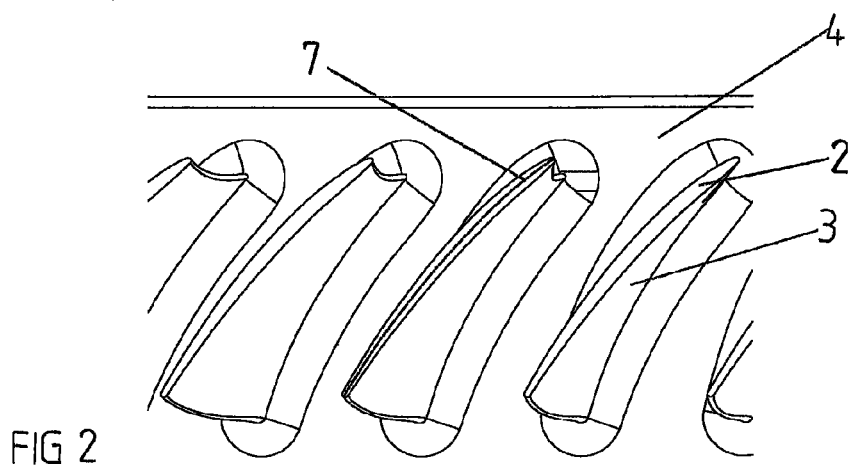
Figure 3:
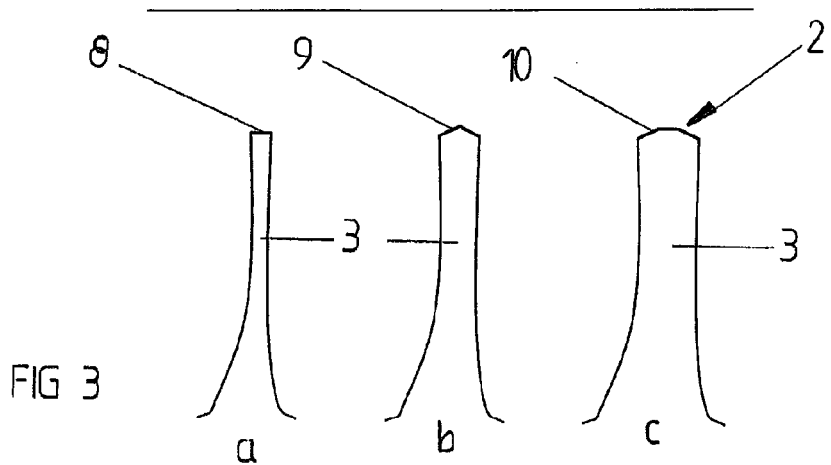

Milling is normally performed along the centerline 7—shown in FIG. 2—of the blade tip 2, with the cutting force being introduced always perpendicular to the tool axis 11 and in the stiffest direction of the blade 3. In this case, the—plane or linear—blade tip geometry 8 shown in FIG. 3a is obtained. By slightly offsetting the tool path from the centerline 7, a ramp-like (FIG. 3b) or a faceted (FIG. 3c) blade tip geometry 9 or 10, respectively, is also producible.

Rough-milling and finish-milling can—as described hereinbefore—be performed as complete process on the respective stage 4, i.e. pre-milling followed by finish-milling of the entire stage, or also blade by blade in the respective stage. Besides new manufacture, the repair of individual stages or blades in a compressor drum also falls within the scope of the present invention.

The method described is less time-consuming and cost-intensive than the formerly used grinding process since it allows damping devices or cast-in damping mechanisms to be dispensed with. In a turning-milling center, reference surfaces, reference diameters and blade tip diameters are producible in one clamping set-up, enabling dimensional accuracy to be improved and the processing time further reduced.

LIST OF REFERENCE NUMERALS

1 Compressor rotor, compressor drum
2 Blade tips
3 Blades
4 Stage, compressor stage
5 Conical cutter
6 Tool cutting edge
7 Centerline of 2
8 Linear blade tip geometry
9 Ramp-like blade tip geometry
10 Faceted blade tip geometry
11 Tool axis

What is claimed is:

1. A method for machining blade tips of BLISK type rotor wheels, comprising:
   machining blade tips of at least one chosen from a rotor wheel and a compressor rotor, the at least one chosen from a rotor wheel and a compressor rotor restrained in a clamping fixture by:
   orienting a cutting edge of a conical cutter of a rotary cutting tool tangentially to an outside surface of the at least one chosen from the rotor wheel and the compressor rotor;
   routing the cutting edge on a radially outer surface of one of the blade tips essentially on a centerline of the blade tip, the centerline extending from a leading edge to a trailing edge of the blade tip and bisecting a distance perpendicular to the centerline between opposing suction and pressure sides of the blade tip to follow a curvature of the blade tip from the leading edge to the trailing edge of the blade tip, the routing of the cutting edge on the centerline extending from the leading edge to the trailing edge of the blade tip;
   introducing a cutting force by the cutting edge onto the blade tip in a stiffest direction of the blade by maintaining the axis of the cutting tool at a 90° angle with respect to the centerline, as viewed in a projection plane tangential to an outside surface of the at least one chosen from the rotor wheel and the compressor rotor, as the cutting edge is moved along the centerline.

2. The method of claim 1, wherein a blade geometry, in dependence of a blade thickness and a course of a tool path in relation to the centerline, is at least one of linear, ramp-like and faceted.

3. The method of claim 2, wherein a tip angle of the conical cutter is between 30° and 150° and a helix angle of the conical cutter is between 0° and 60°.

4. The method of claim 3, and further comprising using a coolant-lubricant while performing the blade tip machining.

5. The method of claim 4, and further comprising, upon clamping the at least one chosen from the rotor wheel and the compressor rotor, determining a position and zero position of same using a measuring device, then initially rough-milling all blade tips one after another and, upon subsequent dimensional re-inspection and determination of correction values, finish-milling the blade tips and thereafter, further checking dimensions of the blade tips.

6. The method of claim 5, and further comprising repeating finish-milling and dimensional inspection, if required, until a desired finish dimension is obtained.

7. The method of claim 4, and further comprising, upon clamping the at least one chosen from the rotor wheel and the compressor rotor, determining a position and zero position of same using a measuring device, then initially rough-milling a blade tip and, upon dimensional inspection and determination of the correction values, finish-milling the blade tip, thereafter, further checking dimensions of the blade tip and subsequently processing remaining blades in a same manner.

8. The method of claim 7, and further comprising repeating finish-milling and dimensional inspection, if required, until a desired finish dimension is obtained.

9. The method of claim 1, wherein a tip angle of the conical cutter is between 30° and 150° and a helix angle of the conical cutter is between 0° and 60°.

10. The method of claim 9, and further comprising using a coolant-lubricant while performing the blade tip machining.

11. The method of claim 10, and further comprising, upon clamping the at least one chosen from the rotor wheel and the compressor rotor, determining a position and zero position of same using a measuring device, then initially rough-milling all blade tips one after another and, upon subsequent dimensional re-inspection and determination of correction values, finish-milling the blade tips and thereafter, further checking dimensions of the blade tips.

12. The method of claim 11, and further comprising repeating finish-milling and dimensional inspection, if required, until a desired finish dimension is obtained.

13. The method of claim 10, and further comprising, upon clamping the at least one chosen from the rotor wheel and the compressor rotor, determining a position and zero position of same using a measuring device, then initially rough-milling a blade tip and, upon dimensional inspection and determination of the correction values, finish-milling the blade tip, thereafter, further checking dimensions of the blade tip and subsequently processing remaining blades in a same manner.

14. The method of claim 13, and further comprising repeating finish-milling and dimensional inspection, if required, until a desired finish dimension is obtained.

15. The method of claim 1, and further comprising using a coolant-lubricant while performing the blade tip machining.

16. The method of claim 1, and further comprising, upon clamping the at least one chosen from the rotor wheel and the compressor rotor, determining a position and zero position of same using a measuring device, then initially rough-milling all blade tips one after another and, upon subsequent dimensional re-inspection and determination of correction values, finish-milling the blade tips and thereafter, further checking dimensions of the blade tips.

17. The method of claim 16, and further comprising repeating finish-milling and dimensional inspection, if required, until a desired finish dimension is obtained.

18. The method of claim 1, and further comprising, upon clamping the at least one chosen from the rotor wheel and the compressor rotor, determining a position and zero position of same using a measuring device, then initially rough-milling a blade tip and, upon dimensional inspection and determination of the correction values, finish-milling the blade tip, thereafter, further checking dimensions of the blade tip and subsequently processing remaining blades in a same manner.

19. The method of claim 18, and further comprising repeating finish-milling and dimensional inspection, if required, until a desired finish dimension is obtained.

* * * * *